(12) United States Patent
Pearce, Jr. et al.

(10) Patent No.: US 11,381,130 B2
(45) Date of Patent: *Jul. 5, 2022

(54) CANTILEVER STATOR

(71) Applicant: Tesla, Inc., Palo Alto, CA (US)

(72) Inventors: Edwin M. Pearce, Jr., San Francisco, CA (US); Jim Robbins, San Francisco, CA (US); Scott Heines, Sunnyvale, CA (US); David F. Nelson, Menlo Park, CA (US); Gary A. Pinkley, Fremont, CA (US); Michael Balsamo, San Francisco, CA (US); Augusto E. Barton, Palo Alto, CA (US)

(73) Assignee: Tesla, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,490

(22) Filed: Nov. 4, 2019

(65) Prior Publication Data
US 2020/0244136 A1    Jul. 30, 2020

Related U.S. Application Data

(63) Continuation of application No. 14/557,224, filed on Dec. 1, 2014, now Pat. No. 10,468,937.

(51) Int. Cl.
*H02K 5/00* (2006.01)
*H02K 5/15* (2006.01)
*H02K 5/20* (2006.01)

(52) U.S. Cl.
CPC ............... *H02K 5/15* (2013.01); *H02K 5/00* (2013.01); *H02K 5/203* (2021.01)

(58) Field of Classification Search
CPC ............ H02K 1/18; H02K 1/182; H02K 5/15; H02K 5/20; H02K 9/19; H02K 9/193; H02K 9/197; H02K 5/203
(Continued)

(56) References Cited

U.S. PATENT DOCUMENTS 3,272,136 A * 9/1966 Franzen .............. F04D 15/0077
310/52
3,531,668 A    9/1970 Cathey
(Continued)

FOREIGN PATENT DOCUMENTS

CN      1993872       7/2007
CN    103138520       6/2013
(Continued)

OTHER PUBLICATIONS

Collins English Dictionary, Definition of Hole, 12th Edition 2014.
(Continued)

*Primary Examiner* — Quyen P Leung
*Assistant Examiner* — Eric Johnson
(74) *Attorney, Agent, or Firm* — Knobbe Martens Olson & Bear LLP (57) ABSTRACT

An electric motor includes: a housing having a first rotor bearing and a stator support surface; a cantilever stator that includes a lamination stack, a first side of the lamination stack abutting the stator support surface and a second side of the lamination stack abutting a stator endbell that has a second rotor bearing, wherein the cantilever stator is held by way of tie rods attaching the stator endbell to the housing; and a rotor in the cantilever stator, the rotor held by the first and second rotor bearings.

20 Claims, 7 Drawing Sheets

(58) Field of Classification Search
USPC ... 310/52, 54, 57, 58, 59, 216.049, 216.118, 310/405–407, 411, 425, 429
See application file for complete search history.

(56) References Cited

U.S. PATENT DOCUMENTS

| | | | |
|---|---|---|---|
| 3,577,024 A | 5/1971 | Inagaki et al. | |
| 3,822,967 A * | 7/1974 | Cade | F04D 15/02 417/368 |
| 4,516,044 A | 5/1985 | Bone | |
| 4,796,352 A | 1/1989 | Kawada | |
| 5,220,233 A | 6/1993 | Birch et al. | |
| 5,250,863 A * | 10/1993 | Brandt | H02K 5/20 310/54 |
| 5,469,820 A * | 11/1995 | Data | B60K 6/485 123/192.2 |
| 6,191,511 B1 | 2/2001 | Zysset | |
| 6,329,731 B1 | 12/2001 | Arbanas et al. | |
| 6,359,355 B1 | 3/2002 | Hartsfield | |
| 6,680,552 B2 | 1/2004 | Linden | |
| 7,156,195 B2 | 1/2007 | Yamagishi et al. | |
| 8,183,723 B2 | 5/2012 | Fee et al. | |
| 8,400,029 B2 | 3/2013 | Sugimoto et al. | |
| 8,427,018 B2 | 4/2013 | Dutau et al. | |
| 8,427,019 B2 | 4/2013 | Garriga et al. | |
| 8,432,076 B2 | 4/2013 | Garriga et al. | |
| 2003/0137200 A1 | 7/2003 | Linden | |
| 2003/0200761 A1 | 10/2003 | Funahashi | |
| 2005/0125987 A1 * | 6/2005 | Yamamoto | H02K 15/022 29/596 |
| 2005/0268464 A1 | 12/2005 | Burjes et al. | |
| 2006/0255666 A1 | 11/2006 | Williams | |
| 2008/0030087 A1 | 2/2008 | De Filippis | |
| 2008/0116838 A1 | 5/2008 | Hattori | |
| 2008/0272661 A1 | 11/2008 | Zhou et al. | |
| 2009/0121563 A1 | 5/2009 | Zhou et al. | |
| 2012/0153718 A1 | 6/2012 | Rawlinson et al. | |
| 2013/0136633 A1 | 5/2013 | Kanda | |
| 2013/0187517 A1 | 7/2013 | Asao | |
| 2014/0021831 A1 | 1/2014 | Hayashi | |
| 2014/0271280 A1 | 9/2014 | Ley | |
| 2015/0084478 A1 | 3/2015 | Yamashita | |

FOREIGN PATENT DOCUMENTS

| | | | |
|---|---|---|---|
| JP | 55-061255 | 5/1980 | |
| JP | 05-078156 | 10/1993 | |
| JP | 2008-228486 | 9/2008 | |
| JP | 2008-245352 | 10/2008 | |
| JP | 2012-080733 | 4/2012 | |
| JP | 2012080733 A * | 4/2012 | H02K 5/02 |
| JP | 2013-115860 | 6/2013 | |
| JP | 2013-153580 | 8/2013 | |
| JP | 2015-152946 | 8/2015 | |

OTHER PUBLICATIONS

Yagi et al., Machine Translation of JP2012080733, Apr. 2012 (Year: 2012).

* cited by examiner

CANTILEVER STATOR

INCORPORATION BY REFERENCE TO ANY PRIORITY APPLICATIONS

This application is a continuation of U.S. patent application Ser. No. 14/557,224, filed Dec. 1, 2014, and issued as U.S. Pat. No. 10,468,937 on Nov. 5, 2019, which is incorporated herein by reference in its entirety. Any and all applications, if any, for which a foreign or domestic priority claim is identified in the Application Data Sheet of the present application are hereby incorporated by reference under 37 CFR 1.57.

BACKGROUND OF THE INVENTION

Electric motors and other electrical drive units are used in a variety of contexts. For example, some vehicles have one or more electric motors used for propelling the vehicle. Such motor(s) can be the vehicle's sole traction mode, as in a pure electric vehicle, or it/they can be used in combination with another traction mode, such as in a hybrid vehicle. In some vehicles, separate electric motors are used for driving respective front and rear axles.

The electric motor has a rotor and a stator, where the stator can be contained in part of a housing that also encloses a gearbox and in some cases other components. The process of manufacturing such motors can include a stage of closely fitting together a stator and a housing component, such as a cast aluminum part. In order to assemble the stator into its proper location inside the housing, it may be necessary to heat the cast housing so that its dimensions increase, and thereafter relatively quickly insert the stator component. Thereafter, the contraction as the housing cools down creates the close fit between the parts.

SUMMARY OF THE INVENTION

In a first aspect, an electric motor includes: a housing having a first rotor bearing and a stator support surface; a cantilever stator that includes a lamination stack, a first side of the lamination stack abutting the stator support surface and a second side of the lamination stack abutting a stator endbell that has a second rotor bearing, wherein the cantilever stator is held by way of tie rods attaching the stator endbell to the housing; and a rotor in the cantilever stator, the rotor held by the first and second rotor bearings.

Implementations can include any or all of the following features. The cantilever stator is positioned by at least one pin, a first end of the pin extending into one of the first and second sides of the lamination stack, and a second end of the pin extending into a corresponding one of the stator support surface and the stator endbell. The first end of the pin extends into a hole that is stamped into at least an outer lamination of the lamination stack. The cantilever stator is positioned by multiple pins at each of the first and second sides of the lamination stack. The tie rods are positioned evenly around a circumference of the stator endbell. The tie rods pass through openings in the stator endbell, extend along an outer surface of the cantilever stator, and are attached to the housing at the stator support surface. The housing and the stator endbell are cast pieces. The electric motor further comprises a bucket that covers the stator endbell, tie rods and cantilever stator, the bucket attached to the housing. The electric further comprises reinforcement struts on the bucket. The bucket is essentially cylindrical, and wherein the reinforcement struts comprise at least a first pair of crossing reinforcement struts on a bottom or a side surface of the bucket. The reinforcement struts further comprise at least a second pair of crossing reinforcement struts on another of the bottom or the side surface of the bucket. The bucket is configured to react torque generated by the electric motor.

In a second aspect, an electric motor includes: a housing having a stator support surface; a cantilever stator; means for holding the cantilever stator onto the stator support surface; and a rotor in the cantilever stator.

In a third aspect, a method of assembling an electric motor includes: positioning a cantilever stator and a housing relative each other so that a first side of a lamination stack of the cantilever stator abuts a stator support surface on the housing; placing a rotor within the cantilever stator so that the rotor is held by at least a first rotor bearing in the housing; placing a stator endbell against a second side of the lamination stack, the rotor being held by at least a second rotor bearing on the stator endbell; and attaching the stator endbell to the housing using tie rods, thereby holding the cantilever stator.

Implementations can include any or all of the following features. The method further comprises positioning the cantilever stator relative to the housing using at least one pin. Attaching the stator endbell to the housing comprises passing the tie rods through openings in the stator endbell so that the tie rods extend along an outer surface of the cantilever stator, and attaching the tie rods to the housing at the stator support surface.

DETAILED DESCRIPTION

This document describes examples of electric motors configured to have a cantilever stator attached to a housing by way of tie bonds. Such designs can facilitate a convenient manufacturing process in which the assembly of the housing and stator components is simplified, while allows for adjustments or reassembly of parts if necessary.

Figure 1:
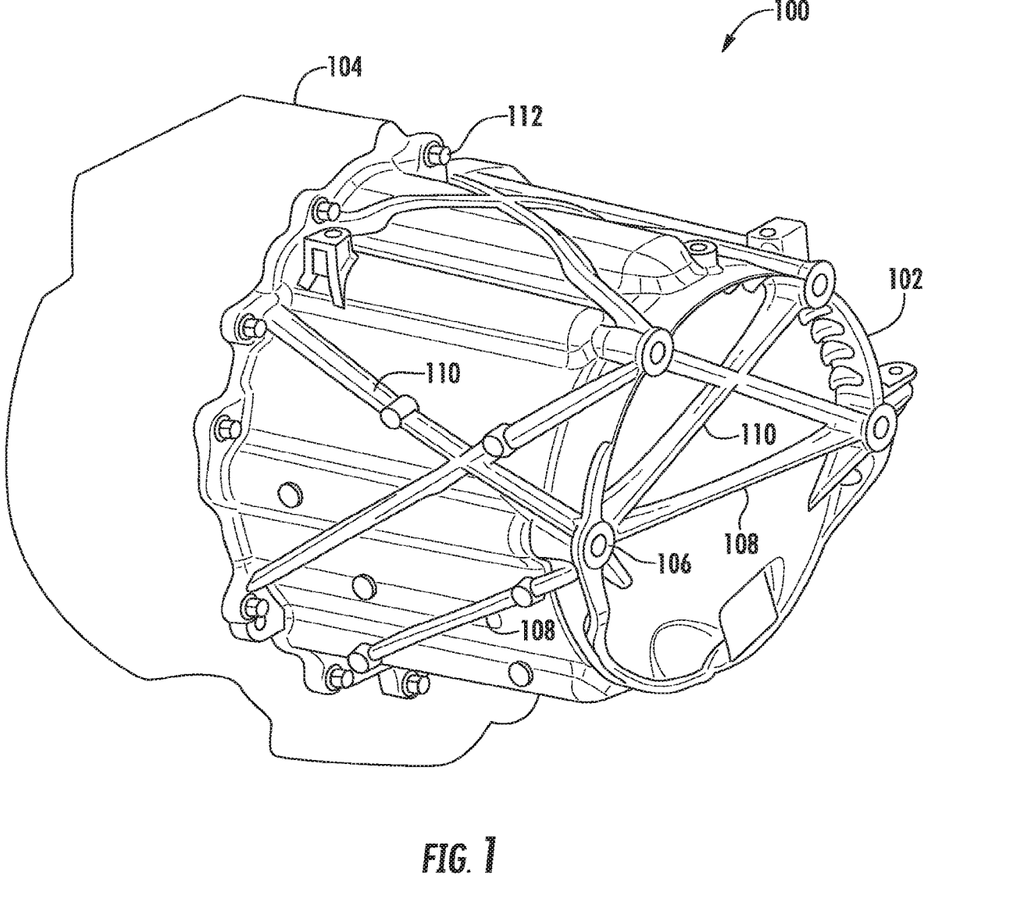
FIG. 1 shows an example of an electric motor with a cantilever stator having a bucket cover.

FIG. 1 shows an example of an electric motor 100 with a cantilever stator having a bucket cover 102. The cantilever stator is underneath the bucket cover in this illustration, and the motor further has a housing 104 that includes various components that are not explicitly shown for simplicity. In some implementations, a gearbox, a power inverter, electric contactors, a cooling system and motor control circuitry are located on the inside or the outside of the housing, as applicable.

The bucket cover 102 can serve one or more purposes for the motor. In some implementations, the cover isolates or otherwise shields a cooling system on or near the stator. For example, the cooling system circulates coolant (e.g., oil or air) around the stator, and the cover can then help direct the coolant onto the stator surface and collect liquid running off the stator. In some implementations, the cover reacts torque generated by the electric motor. For example, the bucket cover has one or more attachments 106 for securing the end of the bucket to a frame or other vehicle component, and torque is then reacted through the cover back into the housing 104.

The bucket cover 102 can have one or more reinforcement struts 108. One or more struts can be placed on the outside or inside of the cover, or both. The strut can be created as part of manufacturing the bucket (e.g., in a molding or casting process), or can be attached afterwards (e.g., by welding). The cover and the strut can be made from any sufficiently strong material, such as metal (e.g., aluminum). In some implementations, one or more crossing reinforcement struts 110 are used. The cover can have crossing reinforcement struts on a bottom or a side surface thereof, or both.

The bucket cover 102 is attached to the housing 104 by any suitable technique. In some implementations, matching attachments are provided near those edges of these respective components that abut when the cover is attached. For example, one or more bolts 112 can be used.

Figure 2:
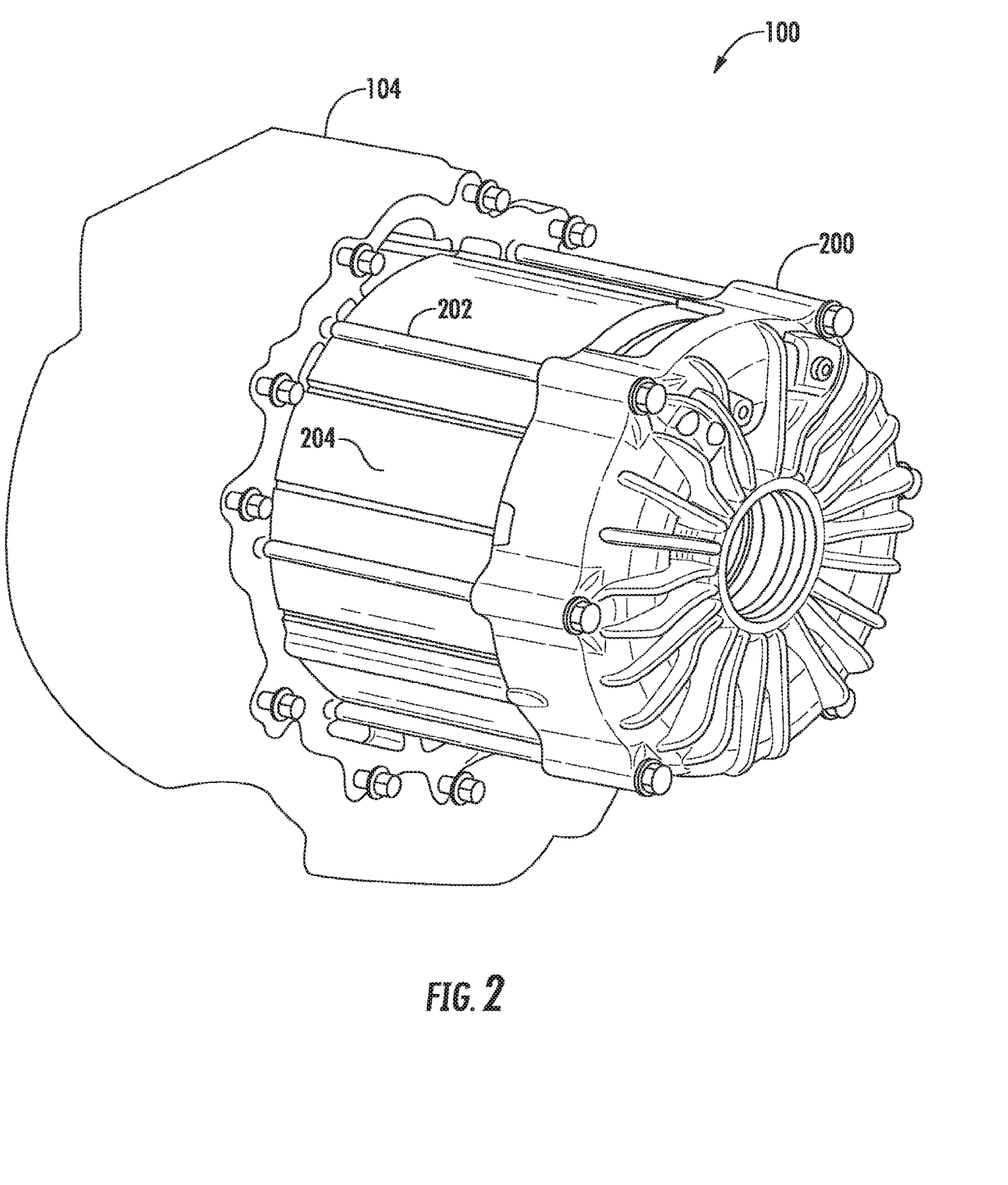
FIG. 2 shows an example of the electric motor of FIG. 1 without the bucket cover.

FIG. 2 shows an example of the electric motor 100 of FIG. 1 without the bucket cover. That is, the motor is now seen to have a stator endbell 200 attached to the housing 104 by way of multiple tie rods 202, thereby holding a cantilever stator 204 in position relative to the housing. That is, the stator endbell and the tie rod attachment to the housing provide a structural reinforcement that secures the stator to the housing.

The stator endbell and the housing can be manufactured using suitable techniques. In some implementations either or both of these components are cast from aluminum or another metal. For example, the cast component can then be machined to provide certain features therein. The stator itself can be manufactured in any suitable way, such as by stamping multiple laminates into a desirable shape and then stacking the laminates so as to form a stator body. The individual laminations are not shown in this illustration for simplicity.

Figure 3:
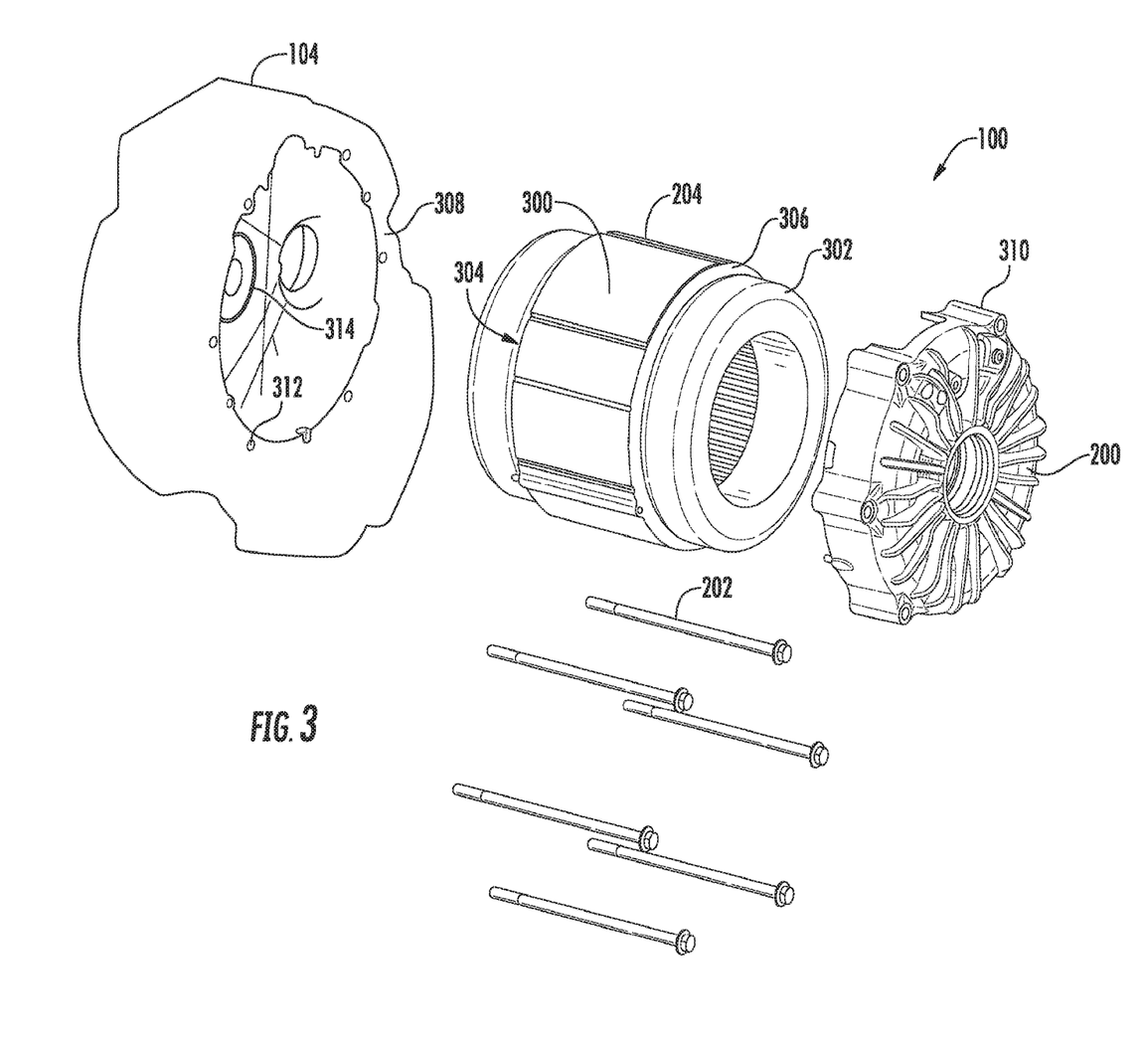
FIG. 3 shows a partially exploded view of the electric motor in FIG. 2.

FIG. 3 shows a partially exploded view of the electric motor 100 in FIG. 2. That is, the housing 104, the stator 204, the stator endbell 200 and the tie rods 202 (in this case, six rods) are shown separated from each other. Here, the stator has a lamination stack 300 with stator endturns 302 at either end thereof. Particularly, the lamination stack forms a first side surface 304 (here obscured) that faces the housing 104, and a second side surface 306 that faces the stator endbell 200.

In assembly, the first side surface 304 will be brought to abut a stator support surface 308 on the housing 104. Here, the surface 308 is planar and has a generally circular shape corresponding to the stator. The opening defined by the surface 308 is large enough to allow the endturns 302 on that side of the stator to extend somewhat into the interior of the housing (i.e., past the surface 308).

Similarly, the second side surface 306 will be brought to abut the stator endbell 200 in assembly. Accordingly, the edge of the stator endbell can likewise be planar and have a generally circular shape corresponding to the stator, albeit its overall shape can differ from that of the surface 308. The stator endbell has a hollow interior facing the stator, thereby allowing the endturns 302 on that side of the stator to extend somewhat into the endbell. That is, the tie rods can in a sense serve to clamp the stator 204 using the endbell, thereby holding the stator onto the stator support surface.

In this example, the attachments for the tie rods 202 are positioned evenly around a circumference of the stator endbell 200, and likewise at the part of the housing 104 abutting the stator. In some implementations, the stator endbell has openings 310 formed thereon that correspond to the individual tie rod. For example, each of the tie rods can be passed through a corresponding one of the openings so that the tie rod extends along an outer surface of the stator (e.g., the lamination stack 300). In some implementations, the end of the tie rod is attached at the housing. Any suitable technique for attaching can be used, including, but not limited to, using threads in openings 312 on the surface 308. The tie rods are made of a material having sufficient strength (e.g., steel).

The housing 104 is here shown having a bearing 314 in its interior. The bearing is positioned to hold one end of a rotor shaft (not shown) when the motor is assembled. The other end of the rotor shaft will be held by a corresponding (though not necessarily identical) bearing in the stator endbell 200, for example as will be discussed below. That is, a rotor (not shown) carried by the rotor shaft will thereby be held in position within the stator 204 by way of the rotor bearings at each end of the shaft.

Figure 4:
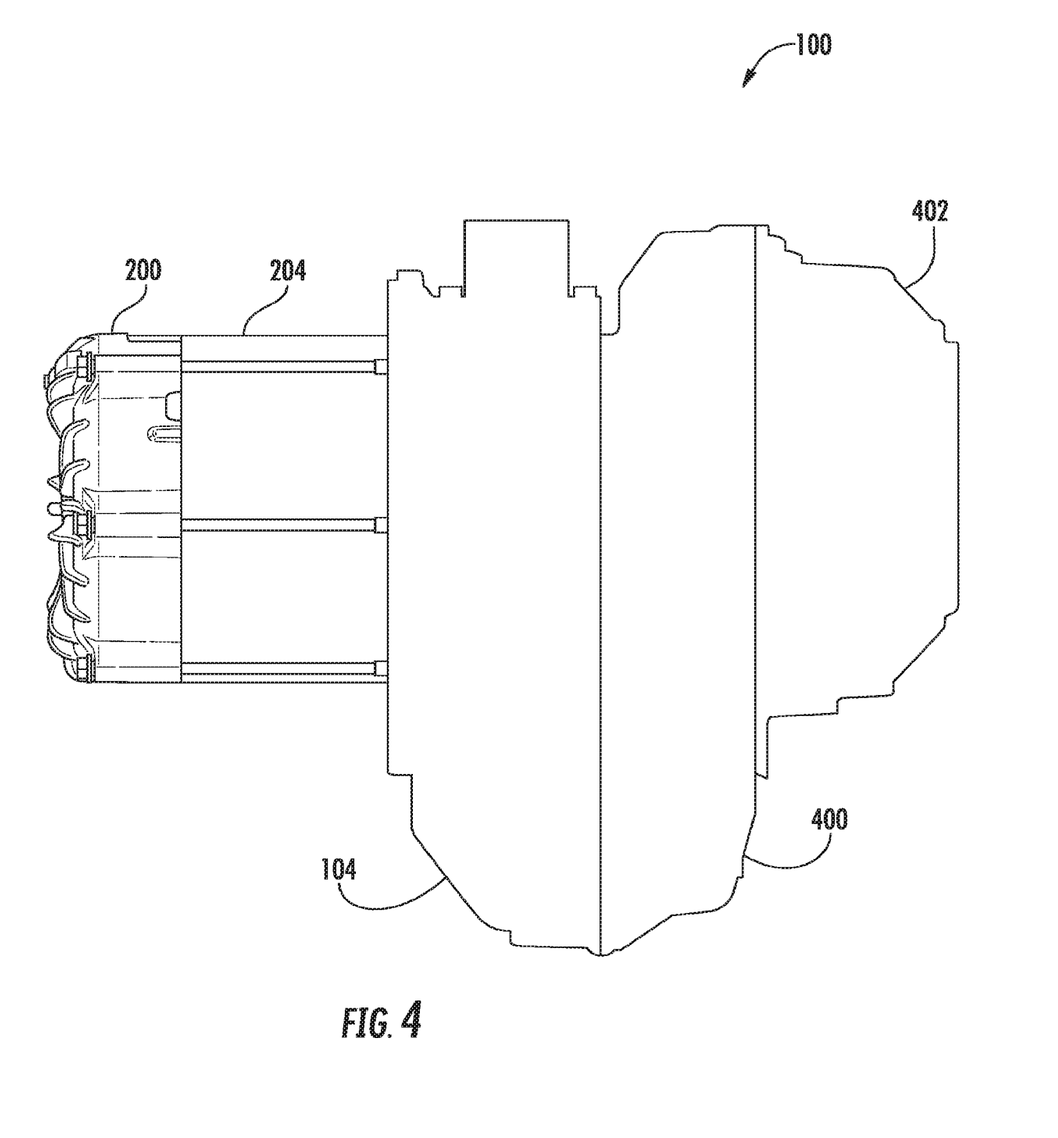
FIG. 4 is a side view of the electric motor in FIG. 2.

FIG. 4 is a side view of the electric motor 100 in FIG. 2. The motor is here shown as having the stator 204 held against the housing 104 by way of the stator endbell 200, the housing further having another case 400 attached thereto. For example, the housing 104 and the case 400 together form an interior space in which the gearbox of the motor is located. A power electronics module 402 (e.g., an inverter) is here mounted to the case 400. For example, the module 402 serves to convert DC into AC for driving the electric motor.

Figure 5:
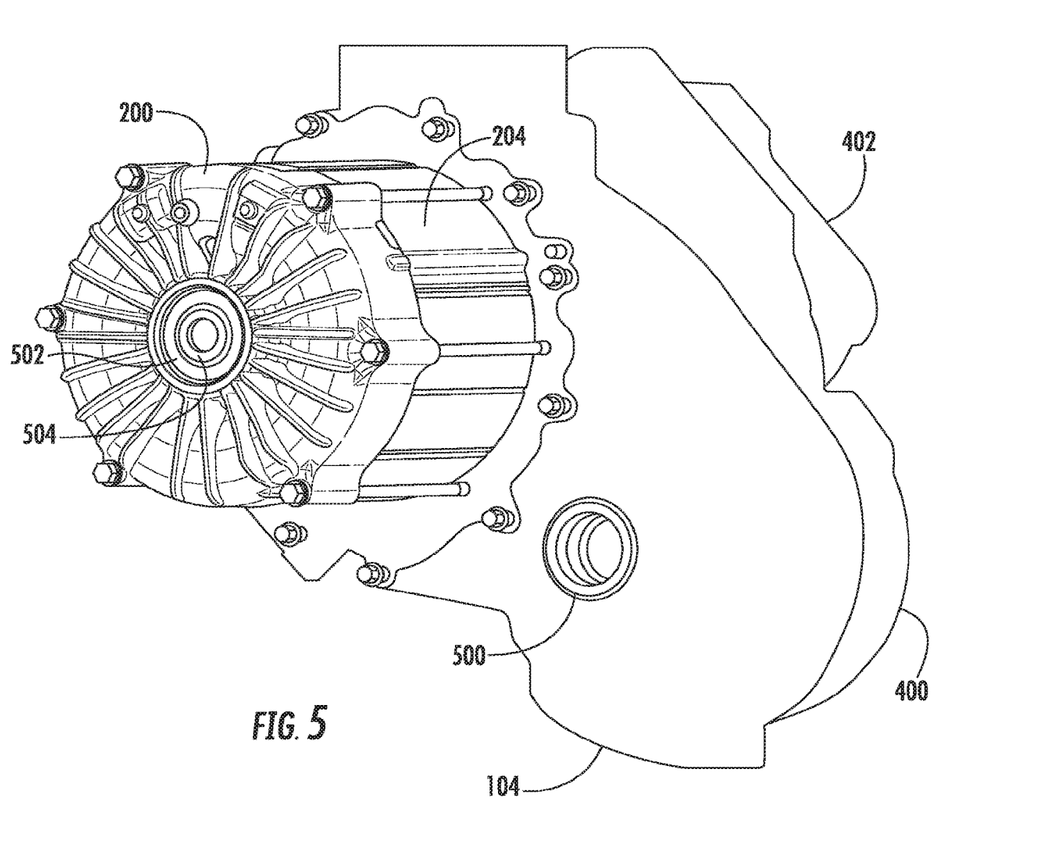
FIG. 5 is a perspective view of the electric motor in FIG. 4.

FIG. 5 is a perspective view of the electric motor 100 in FIG. 4. This illustration shows the motor having the stator endbell 200 and the stator 204, the housing 104 and the case 400, and the power electronics module 402. The housing 104 and/or the case 400 can be configured for having one or more wheel shafts attached thereto. In some implementations, a half shaft (not shown) is connected to the gearbox through an opening 500 in the housing. Similarly, the case 400 can provide a corresponding opening on the other side for a corresponding half shaft. For example, a differential can be provided in the middle of two such half shafts, each shaft driving one wheel of one of the vehicle's axles.

Also, the stator endbell 200 is shown with a rotor bearing 502 that holds a rotor shaft 504. That is, the bearing held by the endbell here provides one side of the rotational suspension of the shaft for the rotor.

Figure 6:
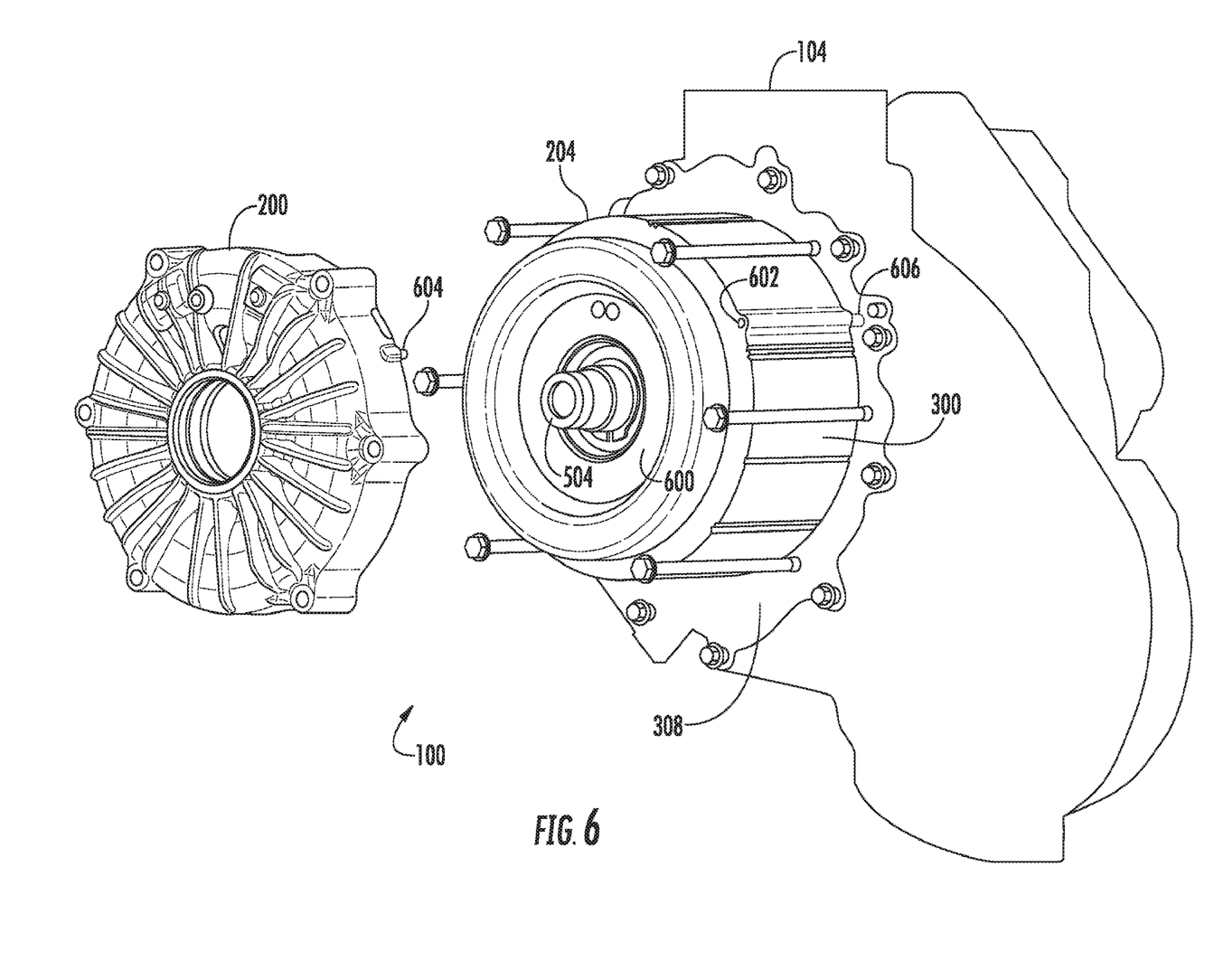
FIG. 6 shows an example of the electric motor in FIG. 5 with the stator endbell removed.

FIG. 6 shows an example of the electric motor 100 in FIG. 5 with the stator endbell 200 removed. That is, the rotor shaft 504 is here seen to have a rotor 600 mounted thereon within the stator 204. Also shown is a hole 602 formed in the lamination stack 300. The hole 602 is here used with a pin 604 on the endbell; a corresponding pin 606 (shown in phantom) interacts with a respective hole in the stator support surface. The holes and the pins are used for positioning and orientating relative to each other the stator 204, the stator endbell and the housing 104. For example, the pin 604 can first be partially inserted into a corresponding opening in the endbell, such that the extending pin portion is then inserted into the opening 602 upon assembly. Similarly, the pin 606 can first be partially inserted into a corresponding opening on the other side of the lamination stack, such that upon assembly the extending pin portion is then inserted into an opening in the stator support surface 308. In some implementations, the motor has more than one of the holes 602 on the circumference of the stator, with corresponding pins that create alignment between the stator and each of the endbell and the housing. For example, two or more holes can be placed at equal intervals around the stator.

The holes and the pins can be manufactured using any suitable technique. In some implementations, the hole 602 is stamped into the laminate as it is being manufactured. For example, all laminates can have the hole stamped into them in the same position on the circumference, thus creating a channel when the laminates are arranged in a stack (this example is shown in the figure). As another example, only one or more of the outermost laminates in the stack can have the hole stamped into it/them. The pins can be made from any material of sufficient strength, such as steel.

Figure 7:
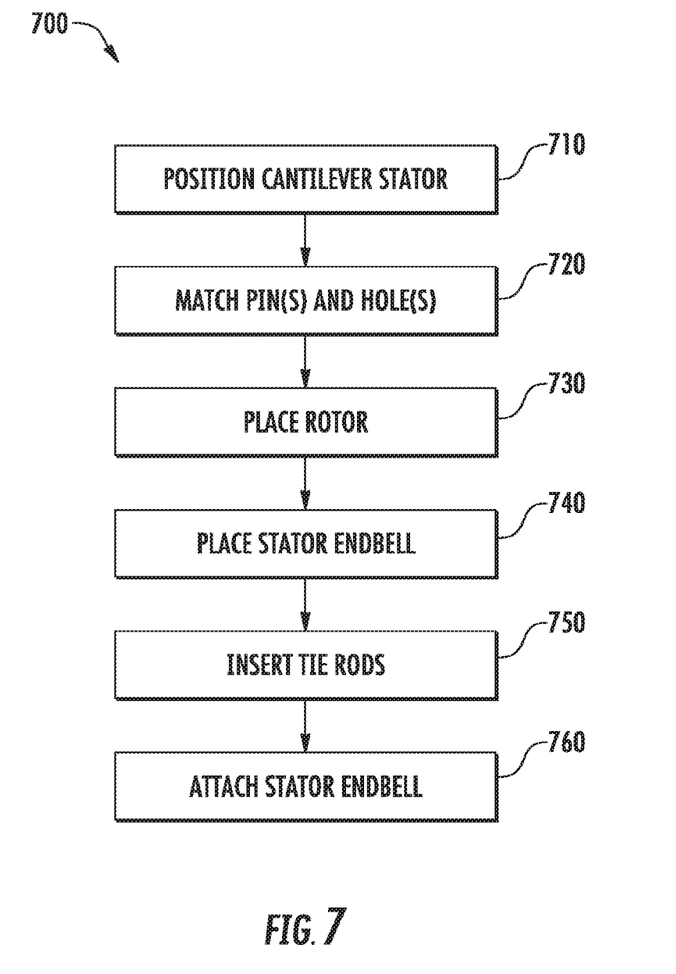
FIG. 7 is an example of a method of assembling an electric motor.

FIG. 7 is an example of a method 700 of assembling an electric motor. The method can be performed in any of a variety of contexts, such as in the original manufacturing of the motor or in a subsequent repair or rebuild of an existing motor. Some examples described above (FIGS. 1-6) will be used for illustration, but the method can be performed also with other types of electric motors. Steps can be performed manually (i.e., by a person) or robotically, or in a combination thereof. The steps can be performed in a different order unless otherwise stated or indicated.

At 710, a cantilever stator is positioned. For example, the cantilever stator 204 and the housing 104 can be brought into position relative each other so that the first side surface 304 of the lamination stack of the cantilever stator is close to the stator support surface 308.

At 720, one or more pins and one or more holes are matched to each other. For example, the pin 606 extending from the stator can be inserted into the hole at the stator support surface 308.

At 730, a rotor is placed. For example, the rotor 600 can be placed within the cantilever stator 204 so that the rotor is held by the rotor bearing 314 in the housing 104.

At 740, a stator endbell is placed. In some implementations, the stator endbell 200 can be placed against the second side surface 306 of the lamination stack. For example, the rotor can then be held also by the rotor bearing 502 on the stator endbell. In some implementations, one or more pin-hole pairs are matched as part of placing the stator endbell.

At 750, one or more tie rods are inserted. For example, the tie rods 202 can be inserted through the openings 310.

At 760, the stator endbell is attached. In some implementations, the tie rods 202 are attached at the openings 312 of the stator support surface 308, thereby holding the cantilever stator in place. For example, a threaded attachment can be used.

Fewer or more steps can be performed in some implementations.

A number of implementations have been described as examples. Nevertheless, other implementations are covered by the following claims.

What is claimed is:

1. An electric motor for a vehicle comprising:
   a housing having a first rotor bearing and a stator support surface;
   a cantilever stator that includes a lamination stack, a first side of the lamination stack abutting the stator support surface and a second side of the lamination stack abutting a stator endbell that has a second rotor bearing;
   a rotor disposed in the cantilever stator, the rotor held in position by the first and second rotor bearings;
   a bucket cover that covers the cantilever stator and the stator endbell, the bucket cover including
   a plurality of first attachments for securing a first end of the bucket cover to the housing;
   a plurality of second attachments on a second end of the bucket cover for securing the second end of the bucket cover to the vehicle;
   a plurality of reinforcement struts extending from the plurality of second attachments to a first end of the bucket cover; and
   a cooling system connected to the housing, wherein the cooling system is configured to circulate coolant around an outer surface of the cantilever stator and within the bucket cover such that the coolant is in direct contact with the cantilever stator.

2. The electric motor of claim 1, further comprising a first alignment pin, wherein the first alignment pin aligns the housing and the cantilever stator to each other, wherein the first alignment pin comprises:
   a first end extending into the first side of the lamination stack; and
   a second end extending into a corresponding opening of the stator support surface.

3. The electric motor of claim 2, wherein the first end of the first alignment pin extends into a hole that is stamped into at least an outer lamination of the lamination stack.

4. The electric motor of claim 2, further comprising a second alignment pin, wherein the second alignment pin aligns the cantilever stator and the stator endbell to each other, wherein the second alignment pin comprises:
   a first end extending into the second side of the lamination stack; and
   a second end extending into a corresponding opening on a surface of the stator endbell.

5. The electric motor of claim 1, further comprising tie rods, wherein the tie rods pass through openings in the stator endbell, extend along the outer surface of the cantilever stator, and are attached to the housing at the stator support surface.

6. The electric motor of claim 5, wherein the bucket cover also covers the tie rods.

7. The electric motor of claim 6, wherein at least a part of the reinforcement struts are located on an exterior of the bucket cover.

8. The electric motor of claim 7, wherein the reinforcement struts comprise one or more pairs of crossing reinforcement struts that cross at least one other reinforcement strut.

9. The electric motor of claim 6, wherein the bucket cover is configured to react torque generated by the electric motor.

10. The electric motor of claim 1,
    wherein additional reinforcement struts extend from one of the plurality of second attachments to another one of the plurality of second attachments.

11. The electric motor of claim 1, wherein the reinforcement struts comprise metal reinforcement struts.

12. The electric motor of claim 1, wherein one or more of the reinforcement struts cross other reinforcement struts.

13. The electric motor of claim 10, wherein one or more of the reinforcement struts or additional reinforcement struts are crossing reinforcement struts on a bottom or a side surface or both of the bucket cover.

14. The electric motor of claim 1, wherein the reinforcement struts are created as part of manufacturing the bucket cover.

15. The electric motor of claim 1, wherein the reinforcement struts are attached to the bucket cover after manufacture of the bucket cover.

16. A method of assembling an electric motor, the method comprising:
- positioning a cantilever stator and a housing relative each other so that a first side of a lamination stack of the cantilever stator abuts a stator support surface on the housing;
- placing a rotor within the cantilever stator so that the rotor is held by at least a first rotor bearing in the housing;
- placing a stator endbell against a second side of the lamination stack, the rotor being held by at least a second rotor bearing on the stator endbell;
- attaching the stator endbell to the housing using tie rods, thereby holding the cantilever stator;
- placing a bucket cover over the cantilever stator and stator endbell;
- attaching a first end of the bucket cover to the housing using a plurality of first attachments of the bucket cover,
- attaching a second end of the bucket cover to a vehicle using a plurality of second attachments of the bucket cover,
- wherein the bucket cover includes a plurality of reinforcement struts extending from the plurality of second attachments to the first end of the bucket cover; and
- circulating coolant around an outer surface of the cantilever stator and within a cover enclosing the stator such that the coolant is in direct contact with the cantilever stator.

17. The method of claim 16, further comprising aligning the cantilever stator and the housing to each other by matching a first alignment pin to a corresponding hole formed in the lamination stack.

18. The method of claim 16, further comprising providing each laminate in the lamination stack with an orifice such that when the lamination stack is created, the orifices align to form a channel in the lamination stack.

19. The method of claim 16, wherein attaching the stator endbell to the housing comprises:
- passing the tie rods through openings in the stator endbell such that the tie rods extend along an outer surface of the cantilever stator; and
- attaching the tie rods to the housing at the stator support surface.

20. The method of claim 16, further comprising aligning the cantilever stator and the stator endbell to each other by matching a second alignment pin to a corresponding hole formed in the lamination stack.

* * * * *